(12) United States Patent
Kim

(10) Patent No.: US 9,797,918 B2
(45) Date of Patent: Oct. 24, 2017

(54) ELECTRONIC DEVICE THAT ENABLES IDENTIFICATION OF IMPACT APPLIED THERETO

(71) Applicant: Samsung Electronics Co., Ltd., Suwon-si, Gyeonggi-do (KR)

(72) Inventor: Jaewook Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 14/753,747

(22) Filed: Jun. 29, 2015

(65) Prior Publication Data
US 2016/0025767 A1  Jan. 28, 2016

(30) Foreign Application Priority Data
Jul. 24, 2014  (KR) .......... 10-2014-0093847

(51) Int. Cl.
| | |
|---|---|
| *G01P 15/06* | (2006.01) |
| *G01P 1/12* | (2006.01) |
| *G01M 7/08* | (2006.01) |
| *G01L 5/00* | (2006.01) |
| *G06F 1/16* | (2006.01) |
| *H04M 1/02* | (2006.01) |
| *H04M 1/18* | (2006.01) |
| *H04M 1/24* | (2006.01) |

(52) U.S. Cl.
CPC ............ *G01P 1/127* (2013.01); *G01L 5/0052* (2013.01); *G01M 7/08* (2013.01); *G01P 15/06* (2013.01); *G06F 1/1656* (2013.01); *H04M 1/0202* (2013.01); *G06F 2200/1633* (2013.01); *G06F 2200/1636* (2013.01); *H04M 1/185* (2013.01); *H04M 1/24* (2013.01)

(58) Field of Classification Search
CPC .......... G01L 5/00; G01L 5/0052; G01M 7/08; G01P 1/12; G01P 1/127; G01P 15/00; G01P 15/04; G01P 15/06; G06F 1/16; G06F 1/1656; G06F 2200/1633; G06F 2200/1636; H04M 1/02; H04M 1/0202; H04M 1/18; H04M 1/185; H04M 1/24; H04M 2250/12
USPC ............................................ 116/203; 73/492
See application file for complete search history.

(56) References Cited

U.S. PATENT DOCUMENTS

| | | |
|---|---|---|
| 2,976,732 A | 3/1961 | Hautly |
| 3,021,813 A | 2/1962 | Rips |

(Continued)

FOREIGN PATENT DOCUMENTS

| | | | | |
|---|---|---|---|---|
| JP | 2010101798 A | * | 5/2010 | .............. G01P 15/00 |
| KR | 10-1244254 B1 | | 3/2013 | |

*Primary Examiner* — Richard A. Smith
(74) *Attorney, Agent, or Firm* — Jefferson IP Law, LLP

(57) ABSTRACT

An electronic device that enables identification of application of an impact is provided. The electronic device includes a module case including a first structure and a second structure having different deformation quantities, a first impact identification part formed between the first structure and the second structure and configured to generate a deformation according to the difference between the deformation quantities of the first and second structures at the time of applying the impact, and a second impact identification part that enables identification of whether the impact was applied based on the deformation of the first impact identification part.

11 Claims, 10 Drawing Sheets

(56) References Cited

U.S. PATENT DOCUMENTS

| | | | | |
|---|---|---|---|---|
| 3,623,449 | A * | 11/1971 | Knutson | G01P 15/036 116/203 |
| 3,626,764 | A * | 12/1971 | Prachar | G01P 15/036 200/61.45 R |
| 4,582,768 | A * | 4/1986 | Takeuchi et al. | G03F 9/00 101/135 |
| 4,982,684 | A * | 1/1991 | Rubey | G01P 15/0891 116/203 |
| 6,272,901 | B1 | 8/2001 | Takeuchi et al. | |
| 7,375,645 | B2 * | 5/2008 | Tsai | G01L 5/0052 340/665 |
| 7,877,909 | B1 * | 2/2011 | Hagen et al. | A01K 11/00 40/300 |
| 2010/0030494 | A1 | 2/2010 | Xi | |
| 2013/0256161 | A1 * | 10/2013 | Crary et al. | B60K 15/03006 206/216 |
| 2014/0033964 | A1 * | 2/2014 | Frangi et al. | G01P 15/04 116/201 |

\* cited by examiner

ELECTRONIC DEVICE THAT ENABLES IDENTIFICATION OF IMPACT APPLIED THERETO

CROSS-REFERENCE TO RELATED APPLICATION(S)

This application claims the benefit under 35 U.S.C. §119 (a) of a Korean patent application filed on Jul. 24, 2014 in the Korean Intellectual Property Office and assigned Serial number 10-2014-0093847, the entire disclosure of which is hereby incorporated by reference.

TECHNICAL FIELD

The present disclosure relates to an electronic device that enables identification of whether an external impact has been applied to a terminal device. More particularly, the present disclosure relates to an electronic device that enables identification of whether an impact has been applied to a terminal device through a mechanical structure.

BACKGROUND

A terminal device or any other small terminal device type product capable of being carried and moved by a user (hereinafter, referred to as a "terminal device") may be subjected to an impact due to dropping of the terminal device by, for example, the user's carelessness, or other forces applied from the outside of the terminal device. Such external forces act on the terminal device in the form of shock, twist, or bending, and as a result, a functional failure or an external deformation may occur in the terminal device.

When the functional failure or the external deformation occurred in the terminal device as described above, the user may apply for an after-sale service, in which case, it is necessary to prove that the functional failure or the external deformation was caused by the user's mistake.

A terminal device of the related art senses whether an external force is applied thereto using a sensor such as a pressure sensor.

However, the terminal device of the related art that senses a force applied thereto from the outside using the pressure sensor has a problem in that, since the terminal device requires a pressure sensor, a circuit for implementing the operation and sensing of the sensor, and a display device for displaying a sensed situation, its configuration is complicated and the manufacturing cost thereof is high.

Thus, a terminal device that enables identification of whether an impact was applied thereto by a force applied from the outside of the terminal device is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that simply and mechanically enables identification of whether an external impact has been applied to a module case of a terminal device.

Another aspect of the present disclosure is to provide an electronic device that enables identification of whether an external impact was applied to a terminal device so as to identify whether there was a user's mistake.

In accordance with an aspect of the present disclosure, an electronic device that enables identification of application of an impact is provided. The electronic device includes a module case including a first structure and a second structure having different deformation quantities, a first impact identification part formed between the first structure and the second structure and configured to generate a deformation according to the difference between the deformation quantities of the first and second structures at the time of applying the impact, and a second impact identification part that enables identification of whether the impact was applied based on the deformation of the first impact identification part.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, an electronic device may be a device that involves a communication function. For example, an electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player(PMP), an Motion Picture Experts Group (MPEG-1 or MPEG-2) Audio Layer 3 (MP3) player, a portable medical device, a digital camera, or a wearable device (e.g., an Head-Mounted Device (HMD) such as electronic glasses, electronic clothes, an electronic bracelet, an electronic necklace, electronic tattoos, an electronic appcessory, or a smart watch).

In the following description, a deformation applied to an electronic device by an external impact includes shock due to dropping of the electronic device by the user's carelessness, or any other deformation generated, for example, by twisting or bending induced by an external force applied from the outside.

Figure 1:
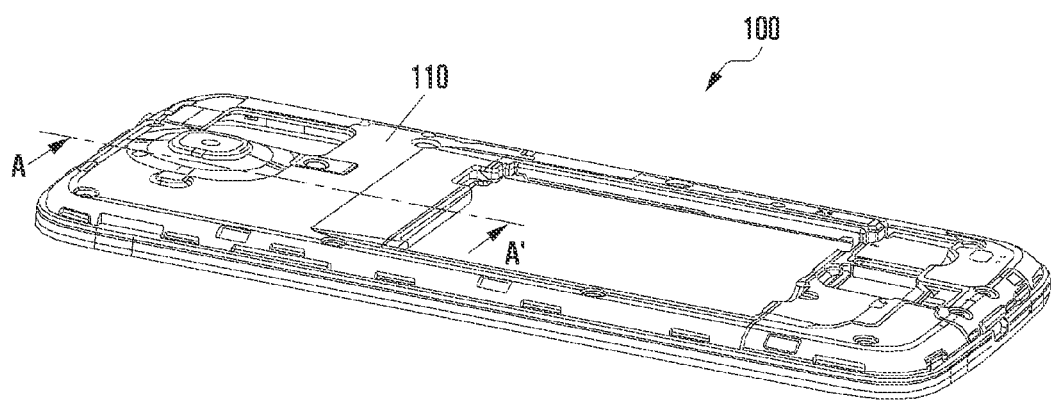
FIG. 1 is a perspective view illustrating a part of an electronic device that enables identification of whether an impact was applied thereto according to an embodiment of the present disclosure.
Figure 2:
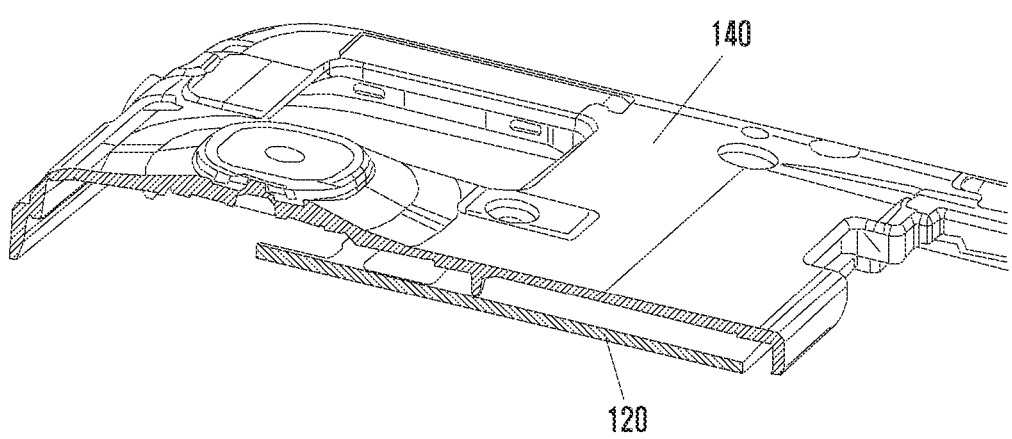
FIG. 2 is a cross-sectional view taken along a line A-A' in FIG. 1 according to an embodiment of the present disclosure.

FIG. 1 is a perspective view illustrating a part of an electronic device that enables identification of whether an impact was applied thereto according to an embodiment of the present disclosure, and FIG. 2 is a cross-sectional view taken along line A-A' in FIG. 1 according to an embodiment of the present disclosure.

Referring to FIG. 1 and FIG. 2, an electronic device 100 that enables identification of application of an impact according to an embodiment of the present disclosure is configured such that the module case 110 is mechanically deformed by the application of an impact exceeding a predetermined level and the application of the external impact can be identified by the deformation. Referring to FIGS. 1 and 2, the electronic device 100 of the present disclosure may include, in the module case 110, a first structure 120 and a second structure 140 having different deformation quantities.

The second structure 140 is relatively soft as compared with the first structure 120. The second structure 140 may include a deformation part 200 that is deformable when an impact exceeding a predetermined level is applied thereto, as a first impact identification part.

The first structure 120 may include a second impact identification part that enables the identification of application of an impact by the deformation of the deformation part 200.

Figure 3:
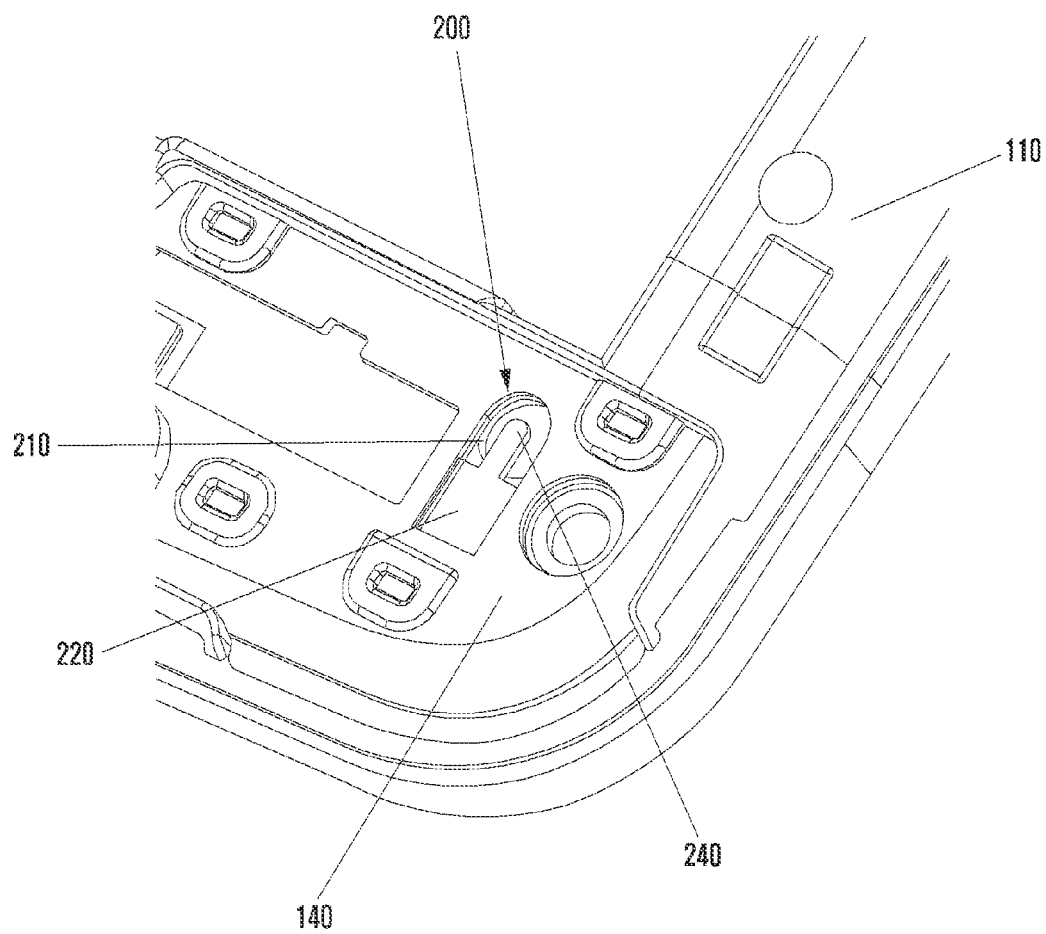
FIG. 3 is a detailed view illustrating a deformation part according to an embodiment of the present disclosure.
Figure 4:
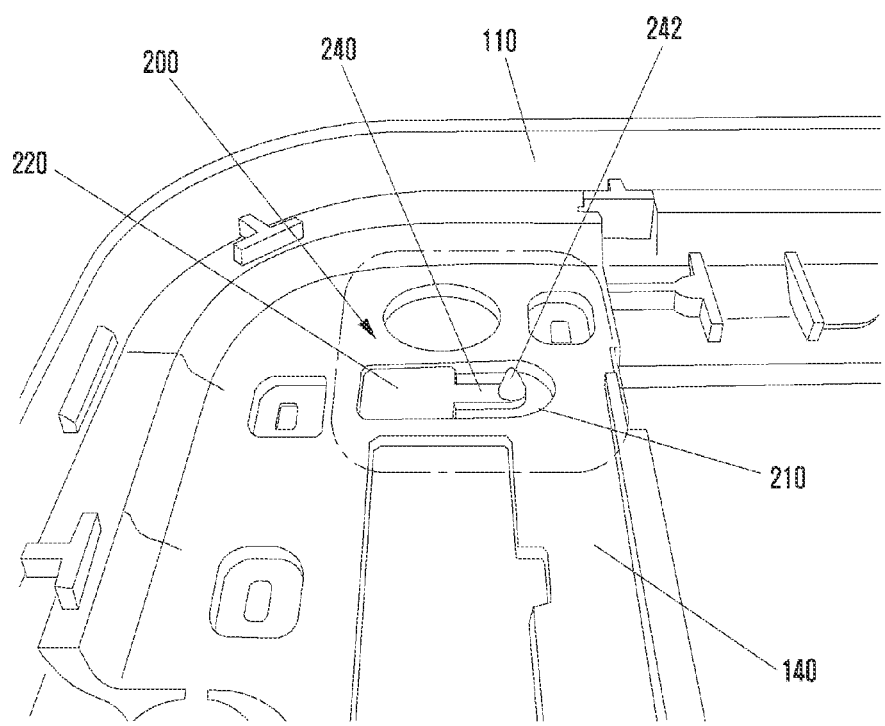
FIG. 4 is a rear view of a deformation part according to an embodiment of the present disclosure.
Figure 5:
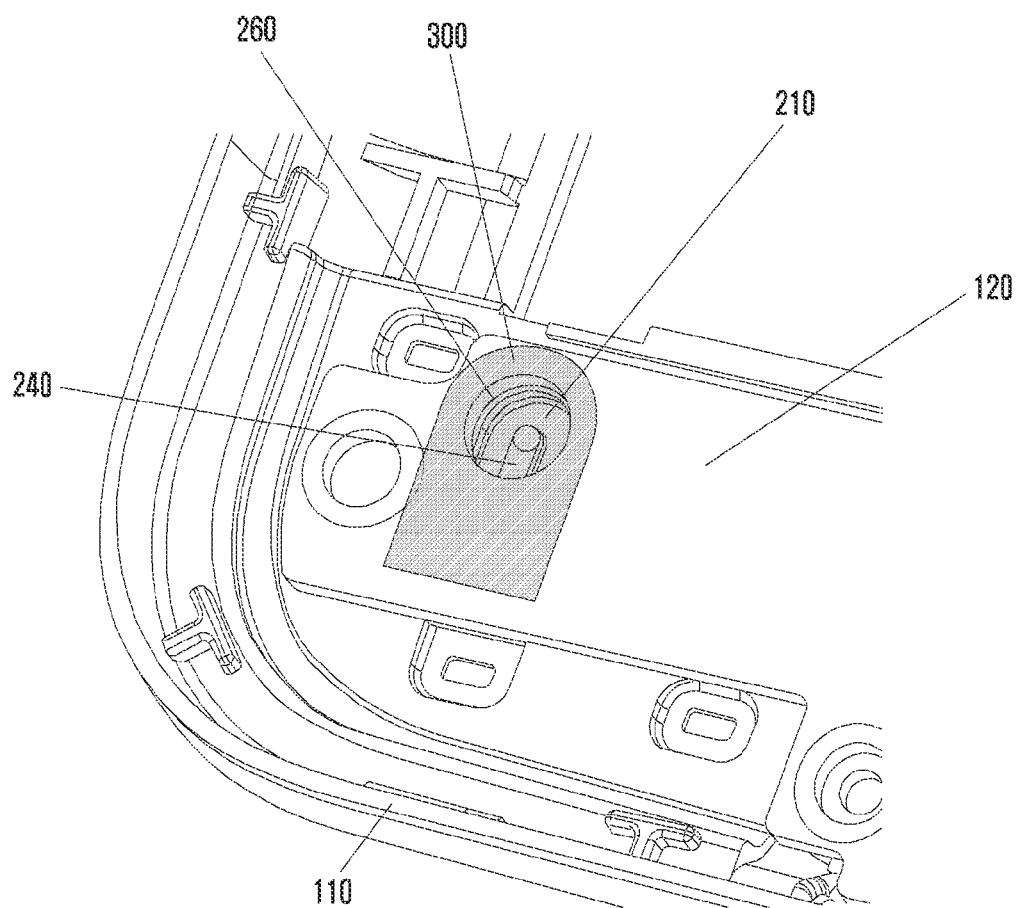
FIG. 5 is a detailed view illustrating an attached state of an impact identification label according to an embodiment of the present disclosure.

FIGS. 3 and 4 illustrate configurations of deformation parts according to an embodiment of the present disclosure, and FIG. 5 illustrates an attached state of an impact identification label according to an embodiment of the present disclosure.

Referring to FIGS. 3, 4, and 5, a deformation part 200 is a first impact identification part, through which an impact applied due to the dropping of the electronic device, includes a recess 210 formed in a second structure 140 such that one side of the recess 210 is closed and the other side is opened.

The deformation part 200 includes a flat portion 220 formed to have a thickness smaller than that of the second structure 140 to be easily deformed by an impact and close one side of the recess 210. The flat portion 220 of the deformation part 200 may have a depth and thickness with a strength corresponding to a predetermined impact level required at the electronic device.

In addition, the deformation part 200 may further include a cantilevered projection piece 240 protruding from the flat portion 220 to the opened side of the recess.

The first structure 120 may include a recess 260 formed in a shape corresponding to the opened side of the recess 210 of the deformation part 200.

A punching pin 242 may be formed on a bottom face of an end of the projection piece 240. The punching pin 242 may be a wedge-shaped pin rib, and may be formed to have a shape capable of readily damaging an impact identification label 300 serving as a second impact identification part.

In addition, the impact identification label 300 as illustrated in FIG. 5 may be attached to the deformation part 200 to close the recess 260 of the first structure 120 as an example of the second impact identification part, in which case, the impact identification label 300 may be formed of a material capable of being damaged by a force exceeding a predetermined level.

Figure 6:
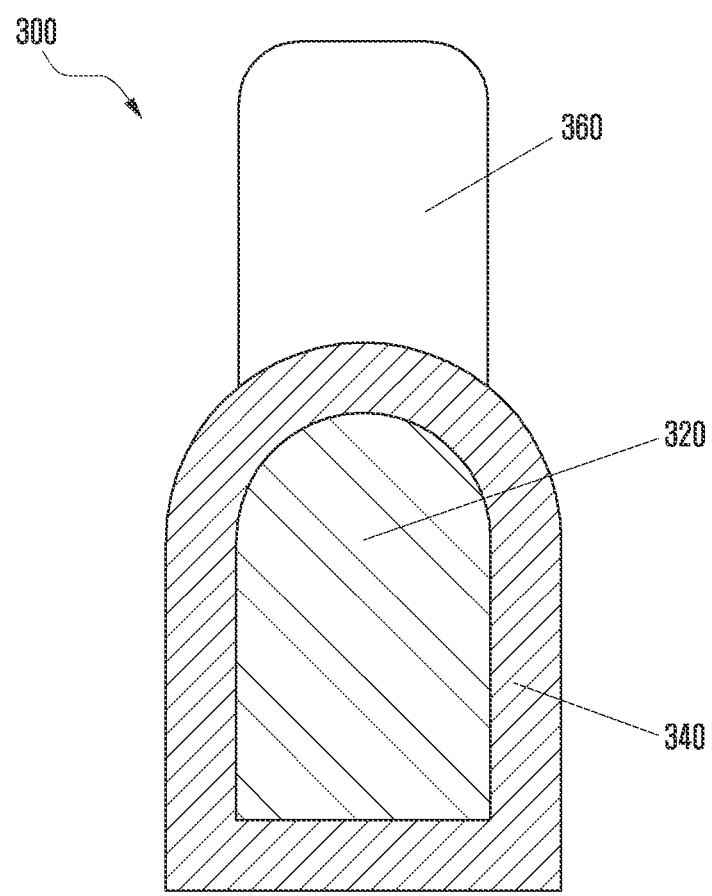
FIG. 6 is a plan view of an impact identification label according to an embodiment of the present disclosure.

FIG. 6 is a plan view of an impact identification label according to an embodiment of the present disclosure.

Referring to FIG. 6, the impact identification label 300 includes an aluminum sheet 320 that is damaged by the deformation of the deformation part 200 by an impact applied to the module case 110 to sense the application of the impact.

A double-sided adhesive tape 340 may be attached to the external bottom face of the aluminum sheet 320.

The adhesive tape 340 includes an assembly-assisting release paper 360 attached to the bottom face thereof.

The assembly-assisting release paper 360 may be released when the impact identification label 300 is attached to the recess 260 of the first structure 120.

Although not specifically illustrated, a protective release paper may also be provided on the top of the aluminum sheet 320 in order to prevent the damage of the aluminum sheet 320.

Figure 7:
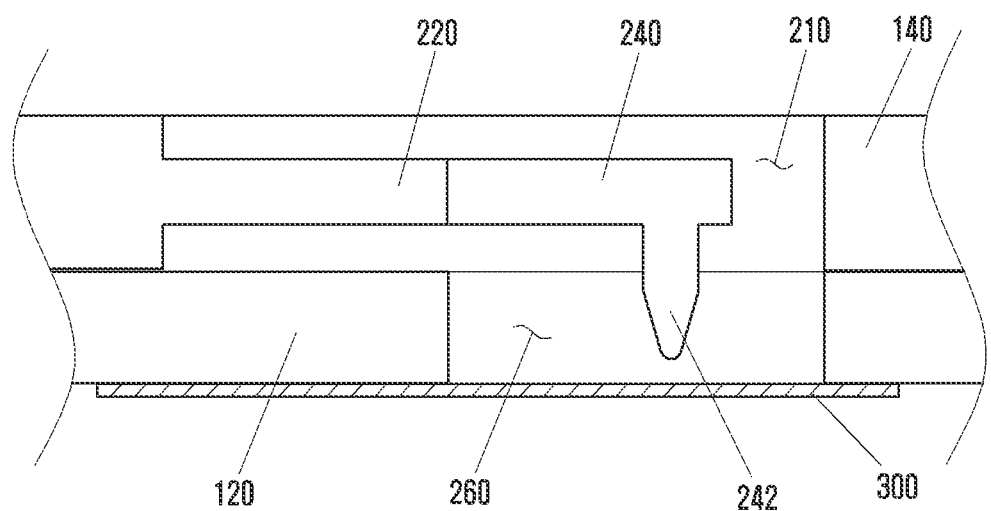
FIG. 7 is a schematic view illustrating an impact identification label in a state where the impact identification label is attached between first and second structures according to an embodiment of the present disclosure.
Figure 8:
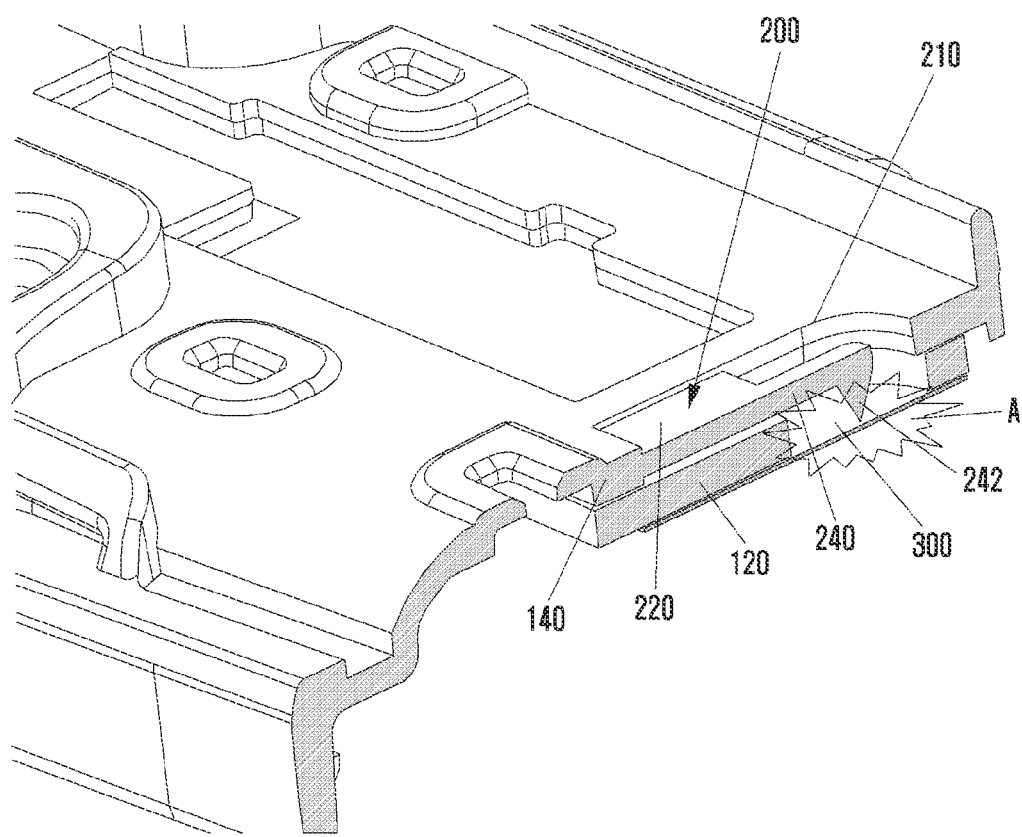
FIG. 8 is a detailed cross-sectional view of the "A" part of FIG. 7 according to an embodiment of the present disclosure.

FIG. 7 is a schematic view illustrating the impact identification label in a state where the impact identification label is attached between first and second structures according to an embodiment of the present disclosure, and FIG. 8 is a detailed cross-sectional view of the "A" part of FIG. 7 according to an embodiment of the present disclosure.

Referring to FIGS. 7 and 8, the deformation part 200 is provided between the first structure 120 and the second structure 140 to be deformed so as to enable identification of the application of an impact.

As the deformation part 200 is deformed by the application of the impact, the punching pin 242 attached to the end of the projection piece 240 comes in contact with the impact identification label 300 attached to the first structure 120 to damage the impact identification label 300.

Figure 9:
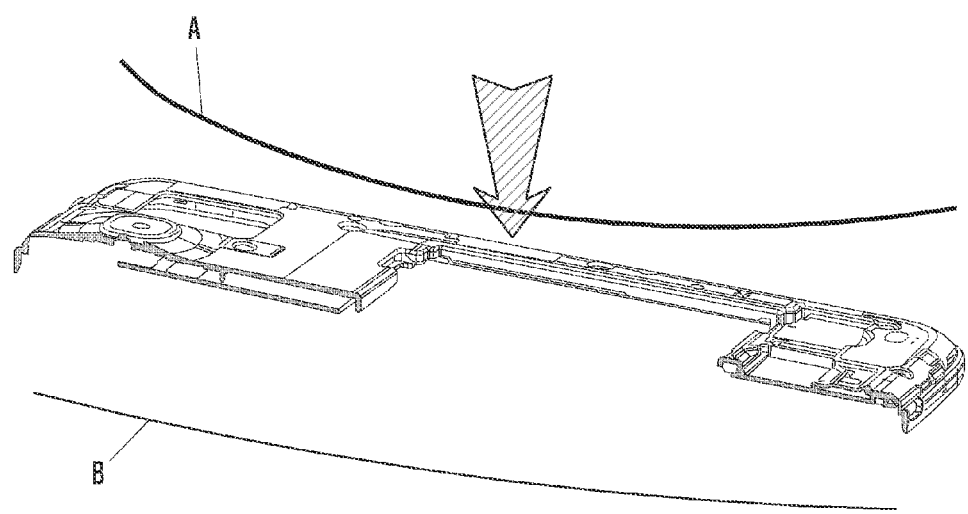
FIG. 9 is a schematic view illustrating a deformation quantity of each of first and second structures which is caused when an impact is applied to an electronic device according to an embodiment of the present disclosure.

For example, when an external force, such as an impact, is applied to the electronic device 100 as indicated by an arrow in FIG. 9, bending occurs in the module case 110 of the electronic device 100, in which case the deformation quantities of the first structure 120 and the second structure 140 may be different from each other.

Since the second structure 140 has a deformation quantity as indicated by line A and the first structure 120 has a deformation quantity indicated by line B, the deformation quantity of the second structure 140 is larger than the deformation quantity of the first structure 120.

For this reason, when an impact exceeding a predetermined level is applied to the module case 110, the projection piece 240 of the deformation part 200 is directed to the first structure 120.

Thus, the projection piece 240 of the deformation part 200 damages the impact identification label 300 attached to the first structure 120, which enables identification of the application of the impact.

The deformation of the deformation part 200 is generated due to the difference between the deformation quantity of the first structure 120 and the deformation quantity of the second structure 140 as described above. For this purpose, the flat portion 220 attached to the recess 210 may be configured to have a thickness smaller than the thickness of the second structure 140.

An impact applied to the electronic device 100 applies different deformation quantities to the first and second structures 120 and 140, respectively, and the deformation quantity of the second structure 140 is larger than the deformation quantity of the first structure 120. Thus, due to the difference in deformation quantity, the projection piece 240 of the deformation part 200 is deformed downwardly as illustrated in FIG. 10, that is, toward the first structure 120 to damage the aluminum sheet 320 attached to the recess 260 of the first structure 120.

Figure 10:
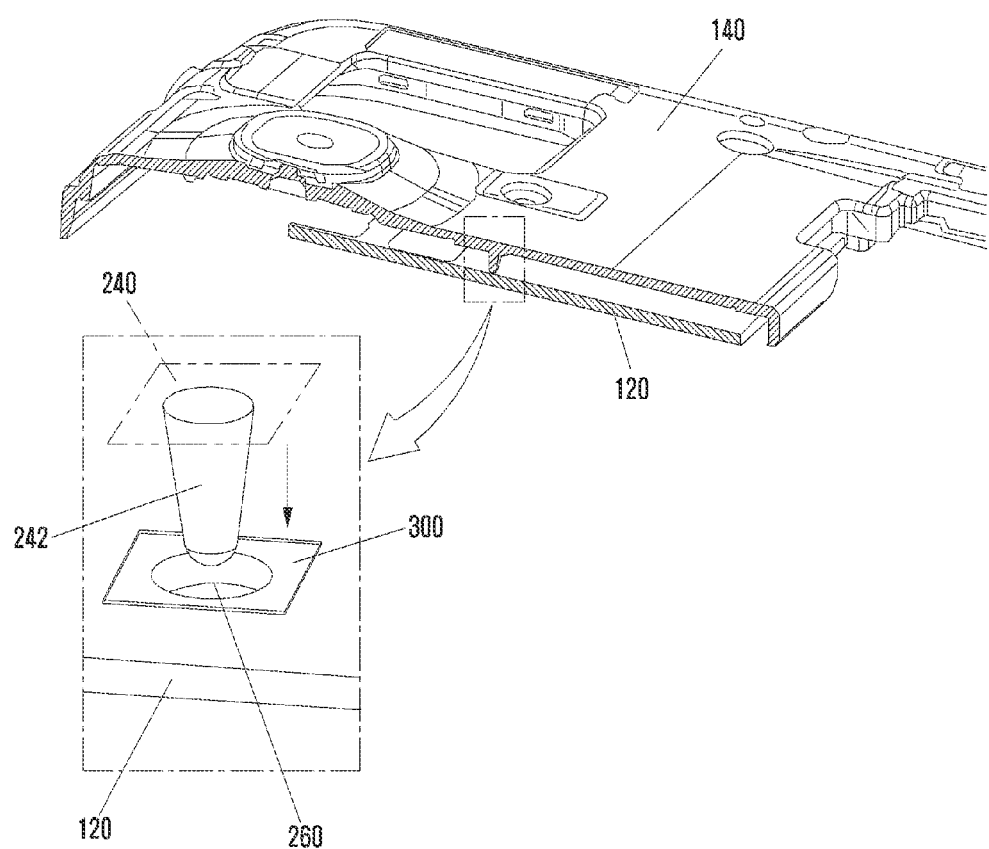
FIG. 10 is a schematic view illustrating a state where an impact identification label is damaged as an impact is applied to an electronic device according to an embodiment of the present disclosure.

FIG. 9 is a schematic view illustrating a deformation quantity of each of the first and second structures which is caused when an impact is applied to the electronic device of FIG. 1 according to an embodiment of the present disclosure, and FIG. 10 is a schematic view illustrating a state where the impact identification label is damaged as an impact is applied to the electronic device of FIG. 9 according to an embodiment of the present disclosure.

Referring to FIGS. 9 and 10, although the impact identification label 300 has been disclosed and described as an example of the impact identification part above, a compression paper capable of indicating a pressure applied as the application of an impact may be used as another example of the impact identification part.

Although the use of the compression paper is not specifically illustrated, as an impact is applied, the punching pin 242 of the projection piece 240 presses the compression paper, and as a result, a conventional compression paper that indicates the extent of the compressing pressure is used. Based on the extent of the pressure indicated thereby, the applied impact can be identified. The detailed descriptions on the compression paper will be omitted.

As described above, according to the electronic device of the present disclosure, it is easy to identify whether an impact was applied to a terminal device from the outside through an inexpensive mechanical identification device.

As a result, according to various embodiments of the present disclosure, since it is possible to determine whether an impact was applied to the terminal device from the outside through the inexpensive mechanical identification device, the electronic device may be used as a device for identifying a user's mistake at the time of after-sale service or a defect analysis device for analyzing a defective specimen.

In particular, since it is possible to identify whether an impact applied to the terminal device is caused by the user's mistake or by the user's intention, it is possible to make the user clearly recognize in advance that the impact generated at the time of using the terminal device was caused by the user's mistake so that the user is more attentive to the management of the terminal device. As a result, the service life of the terminal device can be extended.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device that enables identification of application of an impact, the electronic device comprising:
   a module case including a first structure having a top surface directly mounted to a bottom surface of a second structure, the first structure and the second structure having different deformation quantities according to an applied impact;
   a first impact identification part formed between the first structure and the second structure and configured to generate a deformation according to the difference between the deformation quantities of the first structure and second structure at the time of applying the impact; and
   a second impact identification part that is mounted below a bottom surface of the first structure that enables identification of whether the impact was applied on the electronic device by a tearing of the second impact identification part,
   wherein the second impact identification part is torn down by the deformation of the first impact identification part.

2. The electronic device of claim 1, wherein the deformation quantity of the second structure is greater than the deformation quantity of the first structure.

3. The electronic device of claim 1, wherein the first impact identification part includes:
   a recess formed in the second structure;
   a flat portion attached to close a side of the recess with a thickness smaller than that of the second structure; and
   a projection piece protruding integrally from the flat portion having a punching pin on an end thereof.

4. The electronic device of claim 3, wherein the thickness of the flat portion is smaller than a depth of the recess.

5. The electronic device of claim 3, wherein the punching pin of the projection piece is positioned in a recess formed in the first structure formed to correspond to another side of the recess of the second structure.

6. The electronic device of claim 3, wherein the punching pin of the projection piece applies a force to the second impact identification part by the deformation of the first impact identification part.

7. The electronic device of claim 3, wherein the punching pin comprises a tapered wedge having a pointed tip that is disposed between the top surface and the bottom surface of the first structure.

8. The electronic device of claim 7, wherein the punching pin damages an impact identification label that is attached to the first structure in response to the electronic device receiving an impact.

9. The electronic device of claim 1, wherein the second impact identification part comprises an impact identification label attached to the first structure.

10. The electronic device of claim 9, wherein the impact identification label includes:
    an aluminum sheet deformed by the deformation of the first impact identification part;
    a double-sided adhesive tape attached to an external bottom of the aluminum sheet; and
    an assembly-assisting release paper attached to a bottom of the double-sided adhesive tape.

11. The electronic device of claim 9, wherein the impact identification label comprises a compression paper capable of indicating a pressure applied according to the deformation of the first impact identification part.

* * * * *